(12) United States Patent
Xiao et al.

(10) Patent No.: US 12,451,785 B2
(45) Date of Patent: Oct. 21, 2025

(54) VIBRATION MOTOR

(71) Applicant: AAC Microtech (Changzhou) Co., Ltd., Jiangsu (CN)

(72) Inventors: Bo Xiao, Changzhou (CN); Ronglin Linghu, Changzhou (CN); Wei Song, Changzhou (CN); Lubin Mao, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 195 days.

(21) Appl. No.: 18/536,178

(22) Filed: Dec. 11, 2023

(65) Prior Publication Data

US 2025/0125700 A1   Apr. 17, 2025

Related U.S. Application Data

(63) Continuation of application No. PCT/CN2023/124343, filed on Oct. 12, 2023.

(51) Int. Cl.
*H02K 33/18* (2006.01)

(52) U.S. Cl.
CPC .................................. *H02K 33/18* (2013.01)

(58) Field of Classification Search
CPC ........ H02K 35/00; H02K 35/02; H02K 35/04; H02K 35/06; H02K 7/1869; H02K 7/1876; H02K 7/1892; H02K 33/18; H02K 33/00; H02K 33/02; H02K 33/16
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 6,057,554 A | * | 5/2000 | Plesko | H03K 17/955 250/221 |
| 6,218,767 B1 | * | 4/2001 | Akada | H02N 2/0085 310/323.02 |
| 6,413,117 B1 | * | 7/2002 | Annerino | H01R 12/7076 439/500 |
| 8,358,039 B2 | * | 1/2013 | Trumper | G01Q 10/04 310/12.24 |
| 8,624,450 B2 | * | 1/2014 | Dong | H02K 33/16 310/20 |
| 8,648,502 B2 | * | 2/2014 | Park | H02K 33/16 310/15 |
| 9,225,265 B2 | * | 12/2015 | Oh | G06F 3/016 |

(Continued)

*Primary Examiner* — Maged M Almawri
(74) *Attorney, Agent, or Firm* — Wiersch Law Group

(57) ABSTRACT

Provided is a vibration motor, including a base, an electromagnetic drive unit, a vibration unit, and a vibration feedback control unit. The electromagnetic drive unit includes a magnet-conducting plate and an elastic assembly. The vibration feedback control unit includes a flexible circuit board, a pressure-sensitive block, and an elastic support member. The flexible circuit board includes a circuit board main body, a first circuit board extension, and a second circuit board extension. The pressure-sensitive block is spaced below the vibration unit. The second circuit board extension is located on the top of the pressure-sensitive block. One end of the elastic support member is fixed to the top of the pressure-sensitive block, and the other end thereof is fixed to the vibration unit for transferring vibrations to the pressure-sensitive block. The vibration motor of the present application has a good vibration effect and a better user experience.

10 Claims, 3 Drawing Sheets

(56) References Cited

U.S. PATENT DOCUMENTS

| | | | | |
|---|---|---|---|---|
| 9,543,816 B2* | 1/2017 | Nakamura | | H02K 33/16 |
| 9,948,170 B2* | 4/2018 | Jun | | H02K 33/00 |
| 10,160,010 B2* | 12/2018 | Chun | | H02K 33/16 |
| 10,250,989 B1* | 4/2019 | Xiao | | H04R 23/008 |
| 10,284,959 B2* | 5/2019 | Xiao | | H04R 7/12 |
| 10,483,451 B2* | 11/2019 | Wang | | H10N 30/01 |
| 10,491,090 B2* | 11/2019 | Zu | | H02K 33/16 |
| 10,596,596 B2* | 3/2020 | Ling | | H04R 9/066 |
| 10,674,278 B2* | 6/2020 | Zhou | | H04R 9/025 |
| 10,763,732 B2* | 9/2020 | Liu | | H02K 33/18 |
| 10,886,827 B2* | 1/2021 | Liu | | H02K 33/14 |
| 2006/0066164 A1 | 3/2006 | Kim | | H02K 7/063 |
| | | | | 310/81 |
| 2009/0096299 A1* | 4/2009 | Ota | | B06B 1/045 |
| | | | | 310/25 |
| 2010/0213773 A1* | 8/2010 | Dong | | H02K 33/16 |
| | | | | 310/25 |
| 2010/0302752 A1* | 12/2010 | An | | H02K 33/06 |
| | | | | 361/807 |
| 2011/0057629 A1* | 3/2011 | Lin | | H02K 35/02 |
| | | | | 322/3 |
| 2011/0089772 A1* | 4/2011 | Dong | | H02K 33/16 |
| | | | | 310/25 |
| 2011/0115311 A1* | 5/2011 | Dong | | H02K 33/16 |
| | | | | 310/28 |
| 2011/0133577 A1* | 6/2011 | Lee | | H02K 33/18 |
| | | | | 310/15 |
| 2011/0241451 A1* | 10/2011 | Park | | H02K 33/16 |
| | | | | 310/25 |
| 2012/0032535 A1* | 2/2012 | Park | | H02K 35/02 |
| | | | | 310/25 |
| 2012/0108299 A1* | 5/2012 | Yang | | H02K 33/16 |
| | | | | 455/567 |
| 2012/0187780 A1* | 7/2012 | Bang | | H02K 33/16 |
| | | | | 310/25 |
| 2012/0313459 A1* | 12/2012 | Zhang | | H02K 33/18 |
| | | | | 310/25 |
| 2012/0319506 A1* | 12/2012 | Shim | | H02K 33/16 |
| | | | | 310/25 |
| 2013/0093266 A1* | 4/2013 | Hong | | H02K 33/18 |
| | | | | 29/446 |
| 2013/0099600 A1* | 4/2013 | Park | | B06B 1/045 |
| | | | | 310/15 |
| 2013/0119785 A1* | 5/2013 | Han | | G02B 27/646 |
| | | | | 310/12.16 |
| 2013/0119787 A1* | 5/2013 | Yu | | H02K 33/16 |
| | | | | 310/25 |
| 2013/0169072 A1* | 7/2013 | Oh | | H02K 33/16 |
| | | | | 310/36 |
| 2014/0054983 A1* | 2/2014 | Moon | | H02K 33/16 |
| | | | | 310/28 |
| 2014/0062225 A1* | 3/2014 | Kim | | H02K 33/00 |
| | | | | 310/15 |
| 2014/0346901 A1* | 11/2014 | Hayward | | H02K 15/14 |
| | | | | 310/25 |
| 2015/0123498 A1* | 5/2015 | Yang | | H02K 33/16 |
| | | | | 310/25 |
| 2015/0194870 A1* | 7/2015 | Kim | | H02K 33/18 |
| | | | | 310/25 |
| 2016/0164389 A1* | 6/2016 | Jang | | H02K 7/116 |
| | | | | 310/20 |
| 2016/0173990 A1* | 6/2016 | Park | | H04R 9/043 |
| | | | | 381/354 |
| 2016/0254736 A1* | 9/2016 | Jin | | H02K 33/16 |
| | | | | 310/25 |
| 2017/0033653 A1* | 2/2017 | Wang | | H02K 33/16 |
| 2017/0033657 A1* | 2/2017 | Mao | | H02K 33/16 |
| 2017/0076888 A1* | 3/2017 | Ruff | | H02K 35/00 |
| 2017/0104401 A1* | 4/2017 | Umehara | | H02K 33/16 |
| 2017/0250596 A1* | 8/2017 | Son | | H02K 7/08 |
| 2018/0021812 A1* | 1/2018 | Akanuma | | H02K 33/00 |
| | | | | 310/25 |
| 2018/0241295 A1* | 8/2018 | Zu | | H02K 33/14 |
| 2018/0278137 A1* | 9/2018 | Zhu | | H02K 33/18 |
| 2018/0358878 A1* | 12/2018 | Liu | | H02K 1/34 |
| 2018/0367919 A1* | 12/2018 | Xiao | | H04R 31/006 |
| 2019/0044425 A1* | 2/2019 | Zu | | H02K 33/02 |
| 2019/0151895 A1* | 5/2019 | Takahashi | | B06B 1/045 |
| 2019/0246211 A1* | 8/2019 | Xiao | | H04R 7/02 |
| 2020/0412228 A1* | 12/2020 | Mao | | H02K 33/18 |

\* cited by examiner

VIBRATION MOTOR

CROSS-REFERENCE TO RELATED APPLICATIONS

This application is a continuation of International Application No. PCT/CN2023/124343, filed on Oct. 12, 2023, the entire contents of which are incorporated herein by reference.

TECHNICAL FIELD

The present application relates to the technical field of vibration motors, in particular to an electromagnetic vibration motor.

BACKGROUND

As electronic technology advances, portable consumer electronic products, such as smartphones, handheld gaming devices, navigation systems, or handheld multimedia entertainment devices, are becoming increasingly popular. These electronic products commonly utilize linear vibration motors for system feedback, such as phone call alerts, message notifications, navigation prompts, and gaming vibration feedback. With such widespread applications, there is a demand for high-performance and long-lasting vibration motors.

The vibration motor in the related art includes a base with an accommodating space, an electromagnetic drive unit located in the accommodating space and fixed to the base, and a vibration unit. The vibration unit includes a magnet-conducting plate and an elastic assembly supporting the magnet-conducting plate on the base and suspended above the electromagnetic drive unit. The electromagnetic drive unit is electrically energized to form a point magnet and forms a suction force of alternate phasing to the magnet-conducting plate. The elastic support force of the elastic assembly together causes the magnet-conducting plate to vibrate up and down.

However, the vibration motor in the related art fails to realize feedback control of its vibration, and in some electronic terminals with high vibration feedback requirements, its vibration experience effect cannot meet the demand, resulting in a suboptimal user experience.

Therefore, it is necessary to provide a new vibration motor to solve the above technical problem.

SUMMARY

An object of the present application is to provide a vibration motor with good vibration effect and a better user experience.

In order to achieve the above object, the present application provides a vibration motor, comprising:
- a base having an accommodating space;
- an electromagnetic drive unit, located in the accommodating space and fixed to the base, and configured to provide an electromagnetic drive; and
- a vibration unit, comprising a magnet-conducting plate and an elastic assembly supporting the magnet-conducting plate on the base and suspended above the electromagnetic drive unit, wherein the magnet-conducting plate and the elastic assembly are both spaced apart from the electromagnetic drive unit, and the magnet-conducting plate is located within an electromagnetic field range of the electromagnetic drive unit;

wherein the vibration motor further comprises a vibration feedback control unit comprising:
- a flexible circuit board, comprising a circuit board main body fixed to a bottom of the base, a first circuit board extension formed by bending the circuit board main body to extend into the accommodating space, and a second circuit board extension formed by horizontally extended from the first circuit board extension in a direction away from the electromagnetic drive unit; wherein the first circuit board extension and the second circuit board extension are both spaced apart from the electromagnetic drive unit, the vibration unit and the vibration unit;
- a pressure-sensitive block, wherein the pressure-sensitive block is made of polymer conductive material, and is spaced below the vibration unit; the pressure-sensitive block is fixedly stacked on the circuit board main body to form an electrical connection; and the second circuit board extension is attached to a top of the pressure-sensitive block to form a fixed electrical connection; and
- an elastic support member, wherein one end of the elastic support member is fixed to a top of the second circuit board extension, and the other end of the elastic support member is fixed to the vibration unit for transmitting a vibration from the vibration unit to the pressure-sensitive block.

In one embodiment, the elastic support member comprises a first section fixed to a top of the second circuit board extension, a second section bent and extended from the first section towards proximity to the vibration unit, and a third section bent and extended horizontally from the second section, wherein the third section is fixed to the vibration unit.

In one embodiment, the pressure-sensitive block is made of pressure-sensitive silicone.

In one embodiment, both the circuit board main body and the second circuit board extension form a fixed electrical connection with the pressure-sensitive block through at least one of conductive silicone and conductive silver paste.

In one embodiment, both the circuit board main body and the second circuit board extension are provided with a copper foil to be fixed to the conductive silicone or be inserted into the conductive silicone.

In one embodiment, the elastic assembly comprises a fixed arm fixed to the base, a support arm suspended in the accommodating space, and an elastic arm connecting the fixed arm and the support arm; wherein the conductive plate is fixedly supported on the support arm, and the conductive plate is spaced apart from the elastic arm and the fixed arm.

In one embodiment, the elastic assembly further comprises a pad fixed to an upper surface of the support arm, and the magnet-conducting plate is fixedly supported on the support arm through the pad.

In one embodiment, the elastic assembly further comprises a limit block fixed to an upper surface of the fixed arm, wherein the limit block is spaced apart from the magnet-conducting plate.

In one embodiment, the elastic support member is fixed to a side of the support arm away from the magnet-conducting plate.

In one embodiment, there are two elastic assemblies located on opposite sides of the electromagnetic drive unit, respectively, and there are two vibration feedback control units provided in correspondence with the two elastic assemblies, respectively.

Compared with the related art, the vibration motor of the present application is provided with a vibration feedback control unit below the vibration unit, and the vibrations generated by the vibration unit are transmitted to the pressure-sensitive block through the elastic support member. When the vibration motor vibrates or is compressed/stretched by an external force, the deformation generated is transmitted to the elastic support member, causing the elastic support member to be displaced, which in turn causes the pressure-sensitive block to be compressed or stretched to produce a change in resistance. The different lines on the flexible circuit board are connected to the upper and lower ends of the pressure-sensitive block, which correspond to changes in electrical signals through changes in the resistance of the pressure-sensitive block. Thus, it realizes monitoring and feedback of the vibration status of the vibration motor by monitoring changes in electrical signals of the corresponding lines on the flexible circuit board, and realizes real-time adjustment of the input signals of the vibration motor in order to improve its vibration performance, thereby effectively improving the user experience. The vibration feedback control unit is configured to make full use of the free space inside the vibration motor, resulting in a small size of the vibration motor.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

The following description of each embodiment is made with reference to the additional accompanying drawings to exemplify particular embodiments in which the present application may be practiced. Orientation terms such as up, down, front, back, left, right, inside, outside, top, bottom, etc., referred to in the present application are only orientations with reference to the accompanying drawings. Accordingly, the orientation terms used are for illustrating and understanding the present application, and are not intended to limit the present application.

Figure 1:
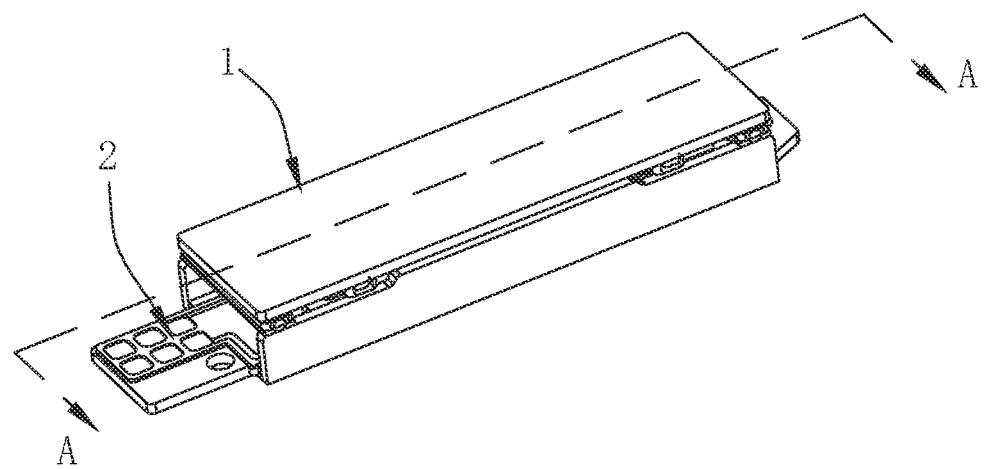
FIG. 1 shows a three-dimensional structural diagram of a vibration motor according to an embodiment of the present application.
Figure 2:
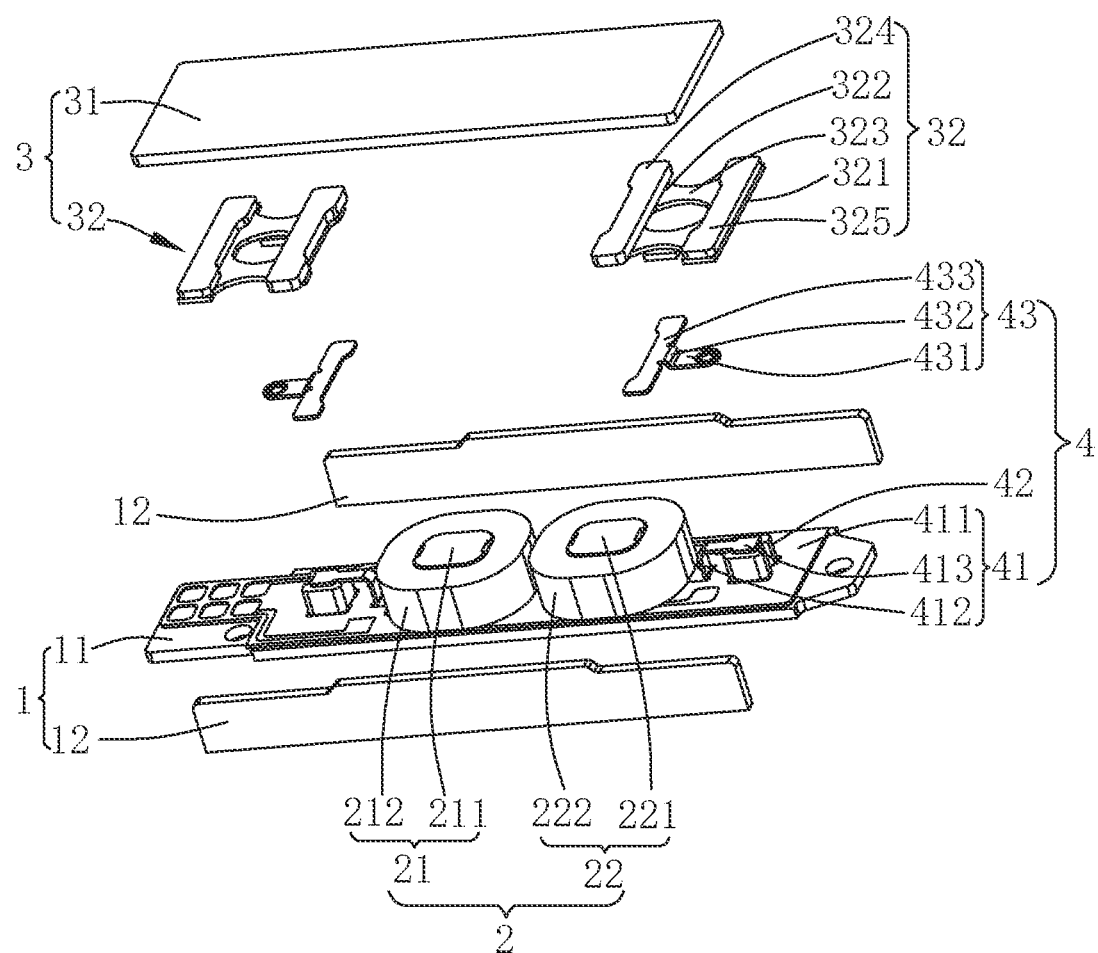
FIG. 2 shows a three-dimensional exploded view of the vibration motor according to an embodiment of the present application.
Figure 3:
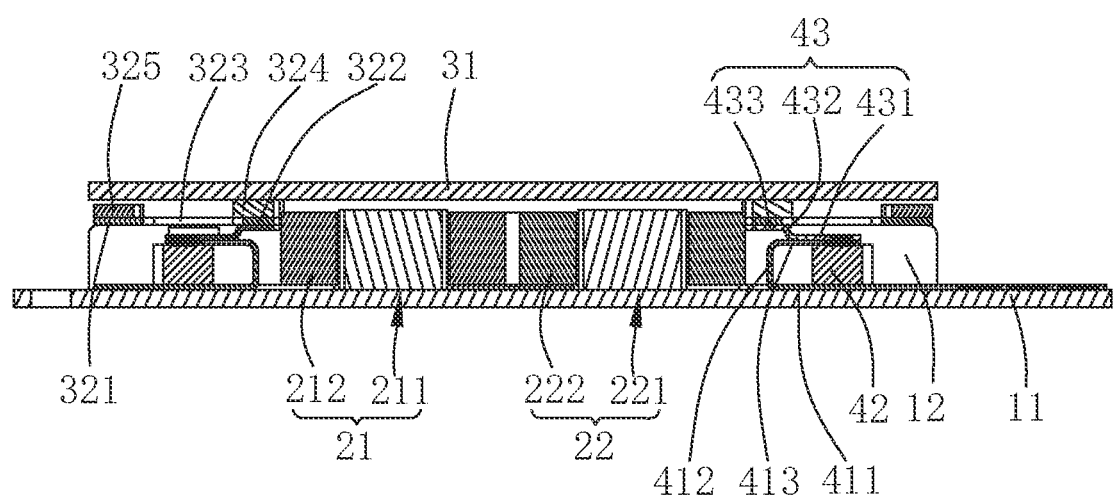
FIG. 3 shows a sectional view along a direction of the line A-A in FIG. 1.

As shown in FIGS. 1-3, an embodiment of the present application provides a vibration motor 100 including a base 1, an electromagnetic drive unit 2, a vibration unit 3, and a vibration feedback control unit 4.

The base 1 has an accommodating space. In this embodiment, the base 1 is rectangular in shape, and includes a base plate 11 and two side plates 12 formed by extended from opposite sides of the long axis of the base plate 11, respectively. The base plate 11 and the side plates 12 together enclose the accommodating space. Of course, the side plates 12 may also be extended from opposite sides of the short axis of the base plate 11, or from all sides of the base plate 11. The base 1 may also be of other shapes.

The base plate 11 and the side plates 12 may be of one-piece structures or of split structures. In this embodiment, the base plate 11 and the side plates 12 are of split structures and are fixedly connected by means of laser spot welding.

The electromagnetic drive unit 2 is located in the accommodating space and fixed to the base 1 for providing electromagnetic driving force. In this embodiment, the electromagnetic drive unit 2 is fixed to the base plate 11 of the base 1.

Specifically, the electromagnetic drive unit 2 includes a first electromagnet 21 and a second electromagnet 22 arranged side by side and spaced apart on the base plate 11. The first electromagnet 21 includes a first magnet 211 fixed to the base plate 11 and a first coil 212 socketed to the first magnet 211. The second electromagnet 22 includes a second magnet 221 fixed to the base plate 11 and a second magnet 221 socketed to the second magnet 221. The first magnet 211, and the second magnet 221 are both magnetized in a direction perpendicular to the bottom plate 11 and in opposite directions.

It should be noted that the first electromagnet 21 and the second electromagnet 22 are spaced apart in the sense that the coils of both are set insulated from each other.

The vibration unit 3 includes a magnet-conducting plate 31 and an elastic assembly 32 fixed at opposite ends of the magnet-conducting plate 31 and supporting the magnet-conducting plate 31 on the base plate 1 and suspended above the electromagnetic drive unit 2. The magnet-conducting plate 31 and the elastic assembly 32 are spaced apart from the electromagnetic drive unit 2. The magnet-conducting plate 31 is located in the electromagnetic field range of the electromagnetic drive unit 2.

Therefore, the first coil 212 and the second coil 222 are energized to cause the first electromagnet 21 and the second electromagnet 22 to form a point magnet, respectively, which alternately form a suction force on the vibration unit 3, causing both ends of the magnet-conducting plate 31 to vibrate under an alternating force.

Specifically, in this embodiment, the magnet-conducting plate 31 is arranged parallel to and spaced apart from the bottom plate 11 and arranged above the electromagnetic drive unit 2.

The elastic assembly 32 includes a fixed arm 321 fixed to the base plate 1, a support arm 322 suspended in the accommodating space, and an elastic arm 323 connecting the fixed arm 321 to the support arm 322. The support arm 322 is fixedly supported on both ends of the magnet-conducting plate 31. The magnet-conducting plate 31 is spaced apart from the elastic arm 323 and the fixed arm 321.

When the first electromagnet 21 and the second electromagnet 22 alternately form a suction force on opposite ends of the magnet-conducting plate 31, respectively, since the first electromagnet 21 and the second electromagnet 22 are magnetized in opposite directions, then the opposite ends of the magnet-conducting plate 31 are not subjected to suction force at the same time, but are subjected to suction force alternately. When one of the ends of the magnet-conducting plate 31 is moved downwardly by the suction force, and at the same time the elastic assembly 32 supporting the corresponding position of the magnet-conducting plate 31 is subjected to a downward pressure, an elastic arm 323 at the corresponding position deforms downwardly. When the suction force disappears, the elastic arm 323 resumes its elastic deformation, in order to provide elastic restoring force for the magnet-conducting plate 31. The above actions are carried out alternately at the opposite ends of the magnet-conducting plate 31, so that a vibration effect is realized at the opposite ends of the magnet-conducting plate 31.

In this embodiment, there are two elastic assemblies 32 located on opposite sides of the electromagnetic drive unit 2. Specifically, the two elastic assemblies 32 are located on a side where the first electromagnet 21 and the second electromagnet 22 are located away from each other. That is, the two elastic assemblies 32 support the two ends of the magnet-conducting plate 31, respectively.

In an embodiment, the elastic assembly 32 further includes a pad 324 fixed to the upper surface of the support arm 322. The magnet-conducting plate 31 is fixedly supported on the support arm 322 through the pad 324, which further ensures an effective spacing between the magnet-conducting plate 31 and the electromagnetic drive unit 2.

In this embodiment, in order to improve the reliability of the vibration effect, the elastic assembly 32 further includes a limit block 325 fixed to the upper surface of the fixed arm 321. The limit block 325 is made of a flexible material. The limit block 325 is spaced apart from the magnet-conducting plate 31, i.e., an upper surface of the limit block 325 is lower than an upper surface of the pad 324, so as to avoid the vibration amplitude of the magnet-conducting plate 31 being too large to collide with the base 1 to produce noises.

The vibration feedback control unit 4 includes a flexible circuit board 41, a pressure-sensitive block 42, and an elastic support member 43.

The flexible circuit board 41 includes a circuit board main body 411 fixed to the bottom of the base 1, a first circuit board extension 412 formed by bent and extended from the circuit board main body 411 toward the accommodating space, and a second circuit board extension 413 formed by extended horizontally from the first circuit board extension 412 in a direction away from the electromagnetic drive unit 2.

Specifically, the circuit board main body 411 is fixed to the bottom plate 11 of the base 1, and the first circuit board extension 412 and the second circuit board extension 413 are both spaced apart from the electromagnetic drive unit 2 and the vibration unit 3.

The pressure-sensitive block 42 is made of polymer conductive material. In this embodiment, the pressure-sensitive block 42 is made of pressure-sensitive silicone. The pressure-sensitive block 42 is spaced apart below the vibration unit 3. The pressure-sensitive block 42 is fixedly stacked on the circuit board main body 411 to form an electrical connection, and the second circuit board extension 413 is attached to the top of the pressure-sensitive block 42 to form a fixed electrical connection.

Specifically, both the circuit board main body 411 and the second circuit board extension 413 are electrically fixed to the pressure-sensitive block 42 through at least one conductive silicone or conductive silver paste.

Alternatively, conductive silicone is applied to the bottom and top of the pressure-sensitive block 42, and both the circuit board main body 411 and the second circuit board extension 413 are provided with a copper foil to be fixed to the conductive silicone or inserted into the conductive silicone, thereby realizing the electrical connection.

One end of the elastic support 43 is fixed to the top of the pressure-sensitive block 42, either directly stacked on the top of the pressure-sensitive block 42, or stacked on the second circuit board extension 413 located on top of the pressure-sensitive block 42, to indirectly stacked on the top of the pressure-sensitive block 42.

The other end of the elastic support member 43 is fixed to the vibration unit 3 for transmitting vibrations from the vibration unit 3 to the pressure-sensitive block 42. In this embodiment, the elastic support member 43 is fixed to a side of the support arm 322 away from the magnet-conducting plate 31. When the vibration motor 100 operates vibration, or is compressed/stretched by an external force, the vibration unit 3 transmits the generated displacement to the elastic support member 43, causing the elastic support member 43 to generate a displacement and act on the pressure-sensitive block 42, causing a change in the resistance of the pressure-sensitive block 42 by compression/stretching, which in turn causes the lines on the flexible wiring board 41 connected to the pressure-sensitive block 42 to generate a change in the electrical signals, thereby, by monitoring the changes in the electrical signals of the corresponding lines of the flexible circuit board 41 in order to realize the monitoring and feedback of the vibration state of the vibration motor 100, realizing real-time adjustment of the input signals of the vibration motor 100 and improving the vibration performance thereof, and effectively improving the effect of the user experience. In addition, the vibration feedback control unit 4 is configured to make full use of the free space inside the vibration motor 100, so that the vibration motor 100 is small in size and may be customized according to the size of different vibration motors, which is not only has a high sensitivity, but also can be adjusted in terms of structure and material according to the need for adjusting the sensitivity.

In this embodiment, the elastic support member 43 includes a first section 431 fixed to the top of the second circuit board extension 413, a second section 432 bent and extended from the first section 431 towards proximity to the vibration unit 3, and a third section 433 bent and extended horizontally from the second section 432. The third section 433 is fixed to the vibration unit 3, i.e., the third section 433 is fixed to the corresponding support arm 322. The second section 432 is provided so that the first section 431 and the third section 433 are not at the same level and form a height difference, so that the vibration effect of the vibration unit 3 is more accurately transmitted to the pressure-sensitive block 42, thereby improving reliability.

In the present embodiment, there are two vibration feedback control units 4, respectively, arranged in correspondence with the two elastic assemblies 32, further improving the monitoring accuracy of the vibration feedback.

Compared with the related art, the vibration motor of the present application is provided with a vibration feedback control unit below the vibration unit, and the vibrations generated by the vibration unit are transmitted to the pressure-sensitive block through the elastic support member. When the vibration motor vibrates or is compressed/stretched by an external force, the deformation generated is transmitted to the elastic support member, causing the elastic support member to be displaced, which in turn causes the pressure-sensitive block to be compressed or stretched to produce a change in resistance. The different lines on the flexible circuit board are connected to the upper and lower ends of the pressure-sensitive block, which correspond to changes in electrical signals through changes in the resistance of the pressure-sensitive block. Thus, it realizes monitoring and feedback of the vibration status of the vibration motor by monitoring changes in electrical signals of the corresponding lines on the flexible circuit board and realizes real-time adjustment of the input signals of the vibration motor in order to improve its vibration performance, thereby effectively improving the user experience. The vibration feedback control unit is configured to make full use of the free space inside the vibration motor, resulting in a small size of the vibration motor.

Described above are only some embodiments of the present application, and it should be noted herein that improvements may be made by those of ordinary skill in the art without departing from the inventive conception of the present application, but all of these fall within the protection scope of the present application.

What is claimed is:

1. A vibration motor, comprising:
   a base having an accommodating space;
   an electromagnetic drive unit, located in the accommodating space and fixed to the base, and configured to provide an electromagnetic drive; and
   a vibration unit, comprising a magnet-conducting plate and an elastic assembly supporting the magnet-conducting plate on the base and suspended above the electromagnetic drive unit, wherein the magnet-conducting plate and the elastic assembly are both spaced apart from the electromagnetic drive unit, and the magnet-conducting plate is located within an electromagnetic field range of the electromagnetic drive unit;
   wherein the vibration motor further comprises a vibration feedback control unit comprising:
   a flexible circuit board, comprising a circuit board main body fixed to a bottom of the base, a first circuit board extension formed by bending the circuit board main body to extend into the accommodating space, and a second circuit board extension formed by horizontally extended from the first circuit board extension in a direction away from the electromagnetic drive unit; wherein the first circuit board extension and the second circuit board extension are both spaced apart from the electromagnetic drive unit, the vibration unit and the vibration unit;
   a pressure-sensitive block, wherein the pressure-sensitive block is made of polymer conductive material, and is spaced below the vibration unit; the pressure-sensitive block is fixedly stacked on the circuit board main body to form an electrical connection; and the second circuit board extension is attached to a top of the pressure-sensitive block to form a fixed electrical connection; and
   an elastic support member, wherein one end of the elastic support member is fixed to a top of the second circuit board extension, and the other end of the elastic support member is fixed to the vibration unit for transmitting a vibration from the vibration unit to the pressure-sensitive block.

2. The vibration motor of claim 1, wherein the elastic support member comprises a first section fixed to a top of the second circuit board extension, a second section bent and extended from the first section towards proximity to the vibration unit, and a third section bent and extended horizontally from the second section, wherein the third section is fixed to the vibration unit.

3. The vibration motor of claim 1, wherein the pressure-sensitive block is made of pressure-sensitive silicone.

4. The vibration motor of claim 1, wherein there are two elastic assemblies located on opposite sides of the electromagnetic drive unit, respectively, and there are two vibration feedback control units provided in correspondence with the two elastic assemblies, respectively.

5. The vibration motor of claim 1, wherein both the circuit board main body and the second circuit board extension form a fixed electrical connection with the pressure-sensitive block through at least one conductive silicone and conductive silver paste.

6. The vibration motor of claim 5, wherein both the circuit board main body and the second circuit board extension are provided with a copper foil to be fixed to the conductive silicone or inserted into the conductive silicone.

7. The vibration motor of claim 1, wherein the elastic assembly comprises a fixed arm fixed to the base, a support arm suspended in the accommodating space, and an elastic arm connecting the fixed arm and the support arm, wherein the conductive plate is fixedly supported on the support arm, and the conductive plate is spaced apart from the elastic arm and the fixed arm.

8. The vibration motor of claim 7, wherein the elastic support member is fixed to a side of the support arm away from the magnet-conducting plate.

9. The vibration motor of claim 7, wherein the elastic assembly further comprises a pad fixed to an upper surface of the support arm, and the magnet-conducting plate is fixedly supported on the support arm through the pad.

10. The vibration motor of claim 9, wherein the elastic assembly further comprises a limit block fixed to an upper surface of the fixed arm, wherein the limit block is spaced apart from the magnet-conducting plate.

* * * * *